Figure 1:
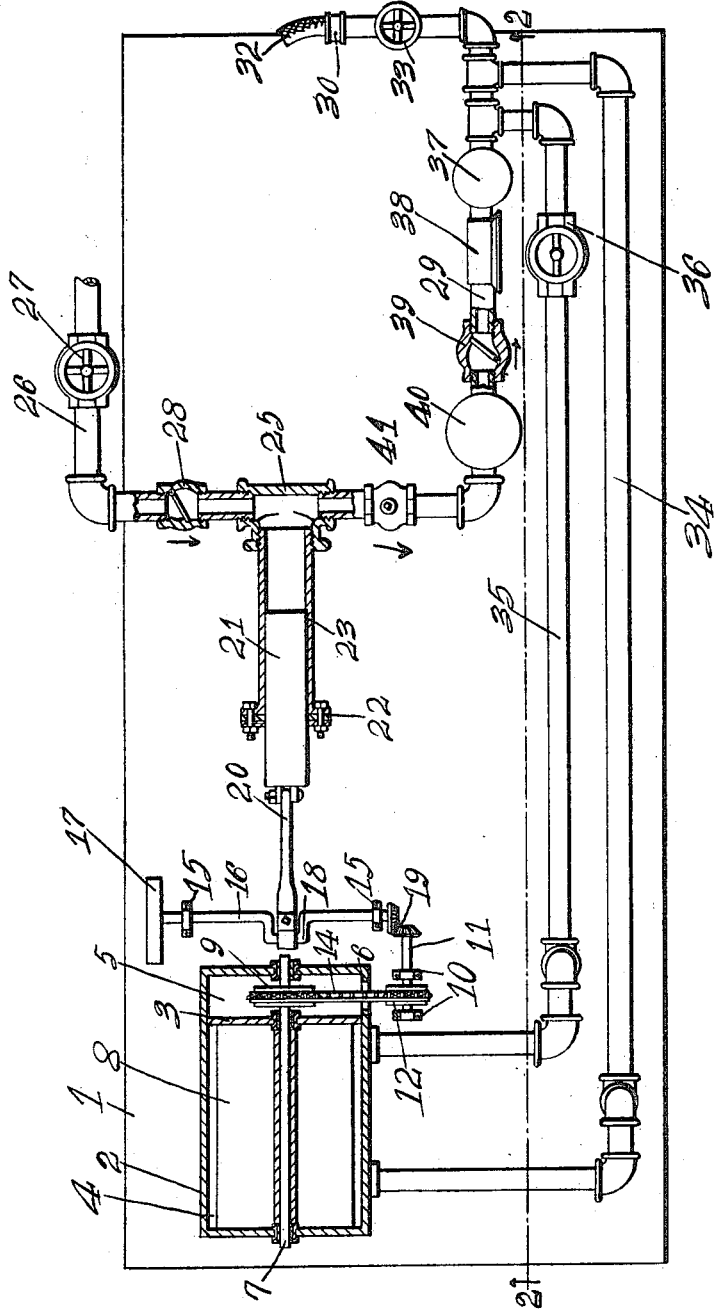

V. H. SLOSSER.
FLUSH BOILER FEED MECHANISM.
APPLICATION FILED OCT. 16, 1916.

1,210,995.

Patented Jan. 2, 1917.
2 SHEETS—SHEET 1.

Witnesses

V. H. Slosser   Inventor
by   Attorneys

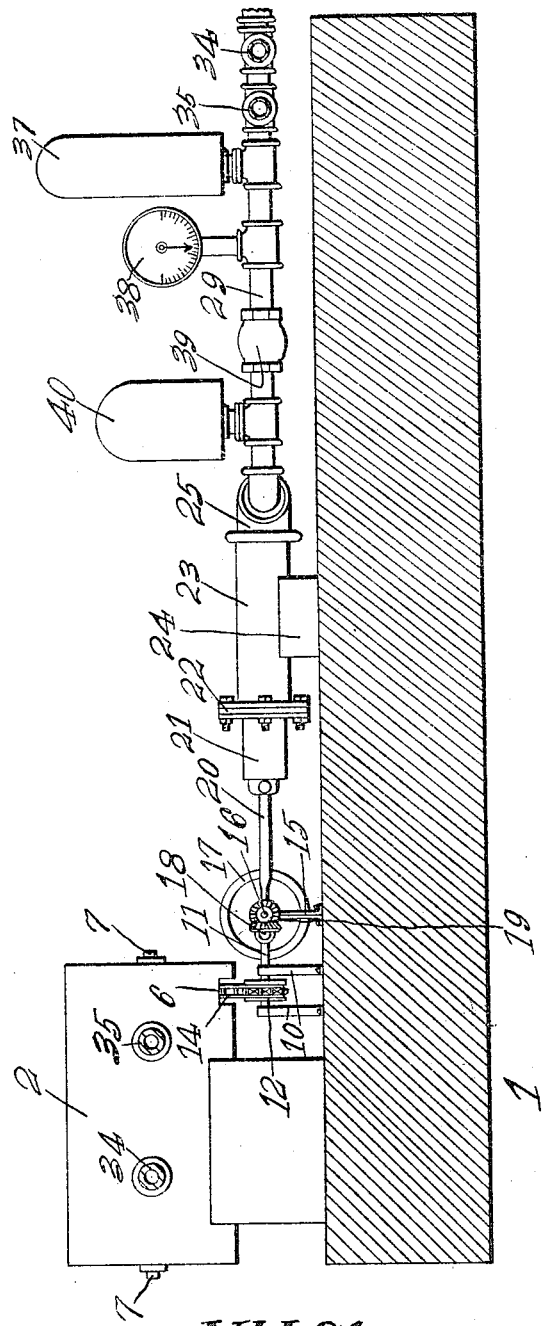

UNITED STATES PATENT OFFICE.

VERNON H. SLOSSER, OF BASCOM, OHIO.

FLASH-BOILER FEED MECHANISM.

1,210,995.  Specification of Letters Patent.  Patented Jan. 2, 1917.

Application filed October 16, 1916. Serial No. 125,986.

*To all whom it may concern:*

Be it known that I, VERNON H. SLOSSER, a citizen of the United States, residing at Bascom, in the county of Seneca and State of Ohio, have invented a new and useful Flash-Boiler Feed Mechanism, of which the following is a specification.

The device forming the subject matter of this application is adapted to be employed for supplying a spray of water to a flash boiler so as to provide a continuous and substantially uniform generation of stream, without constant attention on the part of the operator.

The invention aims to provide novel means for securing a flow of the water, and to provide novel means for actuating the pump.

With the above and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

In the accompanying drawings, Figure 1 is a top plan, wherein parts appear in elevation; Fig. 2 is a section on the line 2—2 of Fig. 1.

In the accompanying drawings, the numeral 1 indicates a support on which is mounted a tank 2 having a cross partition 3 dividing the tank 2 into a compartment 4 and a compartment 5. The compartment 4 may be used to contain any chemical which it is desired to mix with the water. Access is had to the compartment 5 through an opening 6 formed in the side wall of the tank. Journaled for rotation in the tank 2 is a shaft 7 carrying agitating blades 8 operating in the compartment 4. Secured to the shaft 7 within the compartment 5 is a sprocket wheel 9. Bearings 10 are mounted on the support 1 and carry for rotation a shaft 11 disposed substantially parallel to the shaft 7. Mounted on the shaft 11 is a sprocket wheel 12. A chain 14 is trained around the sprocket wheels 9 and 12 and passes through the opening 6. Journaled in bearings 15 on the support 1 is a drive shaft 16 disposed substantially at right angles to the shaft 11. At one end, the shaft 16 is provided with a pulley 17 or any other suitable means whereby the shaft 16 may be rotated from a prime mover. The shaft 16 is equipped intermediate its ends with a crank 18. The shaft 16 is operatively connected with the shaft 11 by means of beveled pinions 19 or the like, the shafts 16 and 11 being placed substantially at right angles to each other.

By means of a pitman 20, the crank 18 of the shaft 16 is connected with a plunger 21 moving in a gland 22 carried by one end of a barrel 23 suitably supported in any desired way as indicated at 24. One end of the pump barrel 23 communicates with a coupling 25. One end of the coupling 25 is connected with an intake pipe 26 carrying a hand valve 27, whereby the flow of water through the pipe 26 may be regulated or cut off. Mounted in the intake pipe 26 between the hand valve 27 and the coupling 25 is a check valve 28 which opens in the direction of the adjacent arrow, toward the pump 23—21.

The numeral 29 designates an outlet pipe united with one end of the coupling 25.

The numeral 30 indicates a coupling whereby one end of the pipe 29 may be connected with a supply hose 32 by which the water is conducted to the boiler or to any other place of use. Interposed in the pipe 29 and located relatively near to the coupling 30 is a hand valve 33 whereby the flow through the pipe 29 may be regulated and controlled.

The numeral 34 indicates a return pipe, connected at one end with the outlet pipe 29 near to the hand valve 33, and connected at its other end with the tank 2.

The numeral 35 indicates a feed pipe extending from the tank 2 and connected with the outlet pipe 29 to the rear of the place where the return pipe 34 joins the outlet pipe. The pipe 35 is provided with a hand valve 36 whereby the flow of liquid through the pipe 35 may be controlled.

The numeral 37 indicates a tank connected with the pipe 29 to the rear of the point of juncture between the pipes 35 and 29. Communicating with the pipe 29 to the rear of the tank 37 is a pressure gage 38. A check valve 39 is interposed in the pipe 29 to the rear of the gage 38 and opens, in the direction of the adjacent arrow, toward the outlet end of the pipe 29. An air chamber 40 communicates with the pipe 29 and is located to the rear of the check valve 39.

Interposed in the pipe 29 between the air chamber 40 and the coupling 25 is a check valve 41 which opens, as indicated by the arrow, in a direction away from the pump 23—21.

A chemical of any kind may be placed in the tank 2, and then the operation of the structure is as follows: When the shaft 16 is driven by the pulley 17 or its equivalent, motion is transmitted to the plunger 21 through the means of the pitman 20 and the crank 18. The plunger 21, reciprocating within the barrel 23, forces water to the intake pipe 26 and forces the water outwardly through the pipe 29 and the hose 32, to the place of delivery. The flow of water through the pipe 26 may be regulated by manipulating the valve 27. The check valve 29 prevents a back flow of water through the pipe 26, under the action of the pump 21—23. The check valve 41 prevents a back flow of water in the pipe 29 between the air chamber 40 and the coupling 25. The air chamber 40 is a common element used in connection with pumps and promotes a continuous flow of liquid through the pipe 29 and the hose 32, even though the plunger 21 of the pump may have a pulsating action. The check valve 39 prevents a back flow of liquid through the pipe 29, between the air chamber 40 and the gage 38. The gage 38 is used to ascertain the pressure in the pipe 29. Surplus liquid in the pipe 29 will rise in the tank 37, and this tank supplements the action of the air chamber 40 to some extent. The flow of liquid through the hose 32 may be regulated by manipulating the valve 33. Surplus liquid passing through the pipe 29 is carried by the pipe 35 back to the tank 2. Should it be desired to increase the flow of liquid back to the tank 2, then the valve 36 in the pipe 35 may be opened, whereupon the pipe 35 will become efficient for the purposes stated. The liquid traversing the pipe 29 tends to flow, to some extent, through the reed pipe 35 to the tank 2, and from the tank 2, the liquid, mixed if desired with chemicals, flows by way of the pipe 34 into the pipe 29 and then outwardly through the hose 32. When the shaft 16 is rotated, motion is transmitted to the shaft 11 through the intermeshing beveled pinions 19, and by means of the socket chain 14 and attendant parts, rotation is imparted to the shaft 7, the blades 8 of which will agitate the contents of the tank 2 before the contents of the tank flows back into the pipe 29, by way of the pipe 34.

The tank 2 may contain a quantity of a boiler compound, sufficient to saturate or partially saturate a large amount of water. The water enters the tank 2 by way of the pipe 35, and passes into the tank either rapidly or slowly, depending upon the extent to which the valve 36 is opened. The water, having entered the tank by way of the pipe 35, is agitated in the tank by the blades 8, and is saturated or partially saturated by the boiler compound or other chemical. The solution, consisting of water and the boiler compound, then passes by way of the pipe 34 into the pipe 29. One of the advantages of the present structure is that the boiler compound may be stored in the tank 2, the water being mixed with the compound as occasion may require, by opening the valve 36.

Having thus described the invention, what is claimed is:—

1. In a device of the class described, a pump; a plunger operating in the pump; a supply pipe communicating with the pump; an outlet pipe communicating with the pump; a tank; separate pipes leading from the outlet pipe to the tank; an agitator operating in the tank; and a common means for actuating both the agitator and the plunger of the pump.

2. In a device of the class described, a pump; a plunger constituting a part of the pump; a supply pipe communicating with the pump; a discharge pipe leading from the pump; a tank; pipes leading from the discharge pipe to the tank; a shaft journaled for rotation in the tank; an agitator carried by the shaft; a drive shaft including a crank; a pitman connecting the crank with the plunger of the pump; a third shaft; means for supporting the third shaft for rotation; means for operatively connecting the third shaft with the drive shaft; and means for operatively connecting the third shaft with the first specified shaft.

In testimony that I claim the foregoing as my own, I have hereto affixed my signature in the presence of two witnesses.

VERNON H. SLOSSER.

Witnesses:
 MARGARET W. HOUSE,
 HARRY J. BLATZ.

Copies of this patent may be obtained for five cents each, by addressing the "Commissioner of Patents, Washington, D. C."